United States Patent
Shimizu (10) Patent No.: US 9,221,436 B2
(45) Date of Patent: Dec. 29, 2015

(54) VEHICLE BRAKE PRESSURE CONTROLLER

(71) Applicant: FUJI JUKOGYO KABUSHIKI KAISHA, Tokyo (JP)

(72) Inventor: Yoshiyuki Shimizu, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 14/081,337

(22) Filed: Nov. 15, 2013

(65) Prior Publication Data

US 2014/0142827 A1 May 22, 2014

(30) Foreign Application Priority Data

Nov. 22, 2012 (JP) ................................. 2012-256697

(51) Int. Cl.
*B60T 7/22* (2006.01)

(52) U.S. Cl.
CPC ............... *B60T 7/22* (2013.01); *B60T 2201/12* (2013.01)

(58) Field of Classification Search
CPC ................................ B60T 7/22; B60T 2201/12
USPC ............................................................. 701/70
See application file for complete search history.

(56) References Cited

U.S. PATENT DOCUMENTS

| 7,433,772 B2 * | 10/2008 | Isaji et al. | 701/71 |
| 2011/0190998 A1 * | 8/2011 | Kato et al. | 701/70 |
| 2013/0030666 A1 * | 1/2013 | Kato | 701/70 |

FOREIGN PATENT DOCUMENTS

| JP | 2001-239929 A | 9/2001 |
| JP | 2002-321609 A | 11/2002 |

* cited by examiner

*Primary Examiner* — Nga X Nguyen
(74) *Attorney, Agent, or Firm* — McDermott Will & Emery LLP (57) ABSTRACT

A brake controlling unit detects a brake actuation object based on images captured by a running environment recognizing unit and sets a target brake pre-pressure actuation distance based on a relative speed between the brake actuation object and a subject vehicle. When an actual distance between the subject vehicle and the brake actuation object reaches the target brake pre-pressure actuation distance, the brake controlling unit outputs to a brake driving unit a driving signal that generates a brake pre-pressure to make the brake clearance of a brake minimal.

15 Claims, 9 Drawing Sheets

VEHICLE BRAKE PRESSURE CONTROLLER

CROSS-REFERENCE TO RELATED APPLICATIONS

The present application claims priority from Japanese Patent Application No. 2012-256697 filed on Nov. 22, 2012, the entire contents of which are hereby incorporated by reference.

BACKGROUND

1. Technical Field

The present invention relates to vehicle brake pressure controllers that previously sense brake timing with which a driver pressed a brake to brake wheels and supplies a brake pre-pressure that brings a friction member of a brake into slight contact or close to a rotating member.

2. Related Art

Conventional vehicle disc brakes generate what is called a drag when a brake pad remains in contact with a disc rotor under non-braking conditions. The drag not only serves as a resistance to degrade power performance but also contributes toward abrasion of the brake pad.

Therefore, under the non-braking conditions, a return spring separates the brake pad from the disc rotor with a predetermined gap. However, when the driver steps a brake pedal, the brake clearance between the brake pad and the disc rotor becomes an invalid stroke to generate a braking delay. Therefore, the brake clearance is preferably narrowed to a minimum.

For example, Japanese Unexamined Patent Publication (JP-A) No. 2002-321609 discloses a technique for performing what is called a first fill operation. Specifically, at an early stage when the driver presses the brake pedal, brake fluid is rapidly supplied to the brake from a master cylinder to immediately cover the invalid stroke of the brake pedal.

For another example, JP-A No. 2001-239929 discloses motor-driven brake control. Specifically, when the driver presses the brake pedal, firstly position control performed to bring the brake pad close to the disc rotor and then power control is performed to press the brake pad against the disc rotor.

However, the technique disclosed in JP-A No. 2002-321609 requires a brake fluid pressure chamber in the master cylinder in order to perform the first fill operation, which complicates the structure, increases in size the master cylinder, and increases product cost.

The technique disclosed in JP-A No. 2001-239929 requires an electric motor, which increases the number of components and the weight, and the installation of the electric motor constrains the layout of components.

SUMMARY OF THE INVENTION

In view of the above circumstances, an object of the present invention is to provide a vehicle brake pressure controller that uses no special component for the brake system including the master cylinder, the brake, and the brake fluid pressure circuit is capable of making the invalid stroke zero or minimal when the driver steps the brake pedal, and achieves an improvement in a brake feeling and a reduction in a brake drag.

An aspect of the present invention provides a vehicle brake pressure controller including: a running environment recognizing unit that is mounted on a vehicle to recognize a running environment ahead the vehicle; a brake driving unit to supply a brake fluid pressure to a brake provided in the vehicle and to press a friction member against a rotating member rotating together with an axle of the brake; and a brake controlling unit to control the brake fluid pressure supplied to the brake from the brake driving unit. The brake controlling unit includes: a brake actuation object detecting unit to detect a brake actuation object based on the running environment recognized by the running environment recognizing unit; a target brake pre-pressure actuation distance setting unit to set a target brake pre-pressure actuation distance based on a relative speed between the brake actuation object and the vehicle when the brake actuation object detecting unit detects a brake actuation object; and a brake pre-pressure outputting unit to output a driving signal to the brake driving unit when a distance between the vehicle and the brake actuation object reaches the target brake pre-pressure actuation distance, the driving signal generating a brake pre-pressure to bring the friction member into slight contact with or close to the rotating member.

Preferably, the target brake pre-pressure actuation distance setting unit sets the target brake pre-pressure actuation distance by correcting a basic brake pre-pressure actuation distance using a learning correction factor. The basic brake pre-pressure actuation distance is set based on the relative speed between the brake actuation object and the vehicle, and the learning correction factor is set based on a vehicle speed of the vehicle.

Preferably, the vehicle brake pressure controller further includes a brake detecting unit to detect pressing of a brake pedal. The brake controlling unit includes a brake pre-pressure learning correction factor updating unit to update the learning correction factor according to a difference between the target brake pre-pressure actuation distance and the distance to the brake actuation object. The brake actuation object is detected by the running environment recognizing unit when the brake detector detects the pressing of the brake pedal.

Preferably, the vehicle brake pressure controller further includes an accelerator opening degree detecting unit to detect the opening degree of an accelerator pedal. When the pressing of an accelerator pedal is detected based on the opening degree of the accelerator pedal detected by the accelerator opening degree detector, the brake pre-pressure outputting unit does not output the driving signal generating the brake pre-pressure to the brake driving unit, even if the distance between the vehicle and the brake actuation object reaches the target brake pressurization actuation distance.

Preferably, the brake controlling unit includes a brake pre-pressure release controlling unit to output, to the brake driving unit, a signal that releases the brake pre-pressure after a setting delay time elapses, when the brake pre-pressure outputting unit outputs the driving signal generating the brake pre-pressure and the brake detecting unit detects the release of the brake pedal after detecting the pressing of the brake pedal.

Preferably, the brake pre-pressure release controlling unit clears the setting delay time when the brake detector detects the pressing of the brake pedal within the setting delay time.

Preferably, the brake pre-pressure release controlling unit outputs a signal to release the brake pre-pressure to the brake driving unit when the accelerator opening degree detecting unit detects the pressing of the accelerator pedal within the setting delay time.

BRIEF DESCRIPTION OF THE DRAWINGS

FIGS. 6A and 6B illustrate brake pre-pressure operation timing and brake pre-pressure release timing.

DETAILED DESCRIPTION

Figure 1:
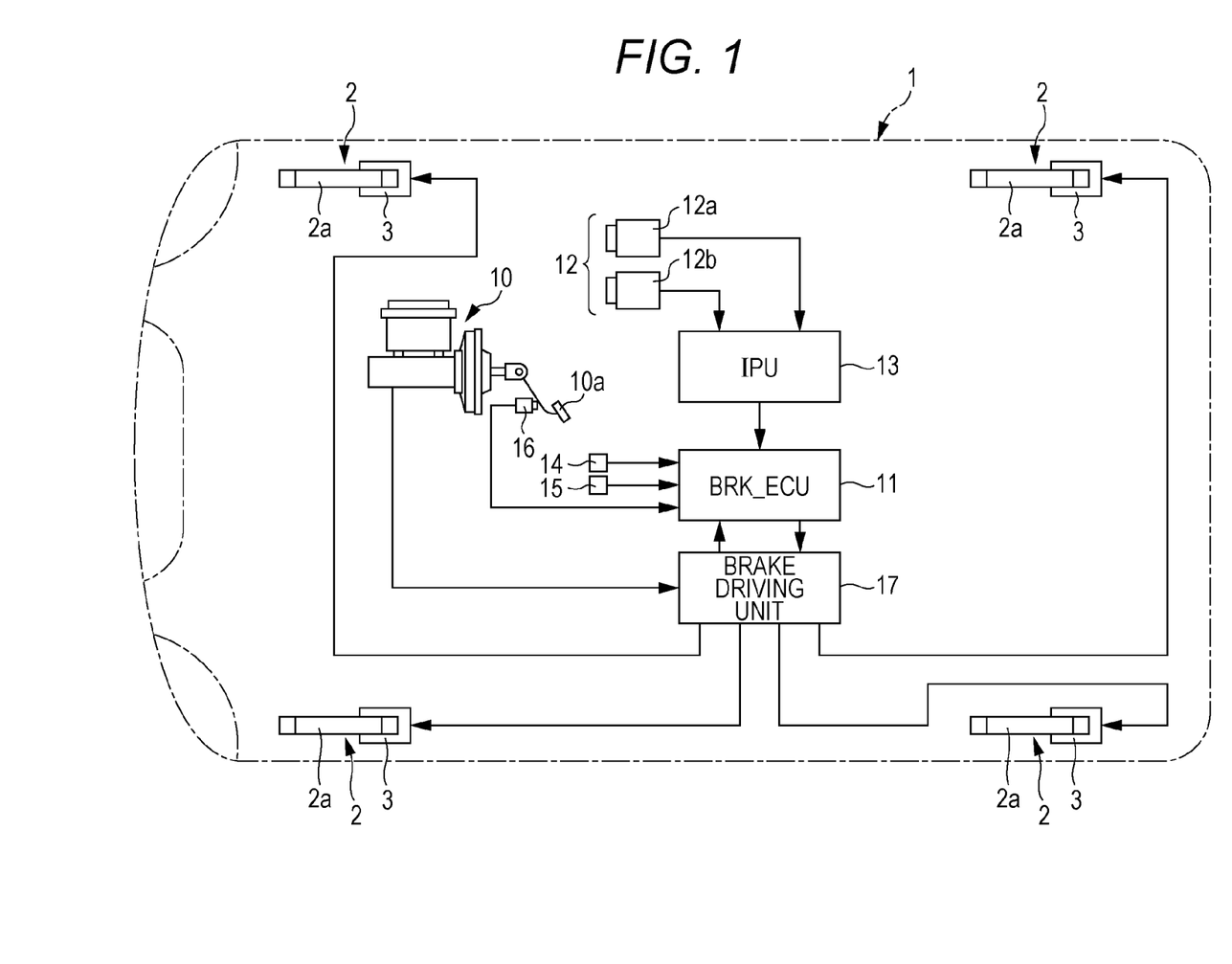
FIG. 1 is a schematic diagram illustrating an entire configuration of a brake controller.

An example of the present invention will be described with reference to the drawings. As illustrated in FIG. 1, a disc brake 2 serving as the brake of the present invention is provided in each of four wheels of a vehicle (subject vehicle) 1. Each disc brake 2 has a disc rotor 2a and a caliper 3. The disc rotor 2a corresponds to the rotating member of the present invention and is fixed to a hub of each axle to integrally rotate. The caliper 3 is fixed to the vehicle body and is capable of nipping the disc rotor 2a.

Figure 2:
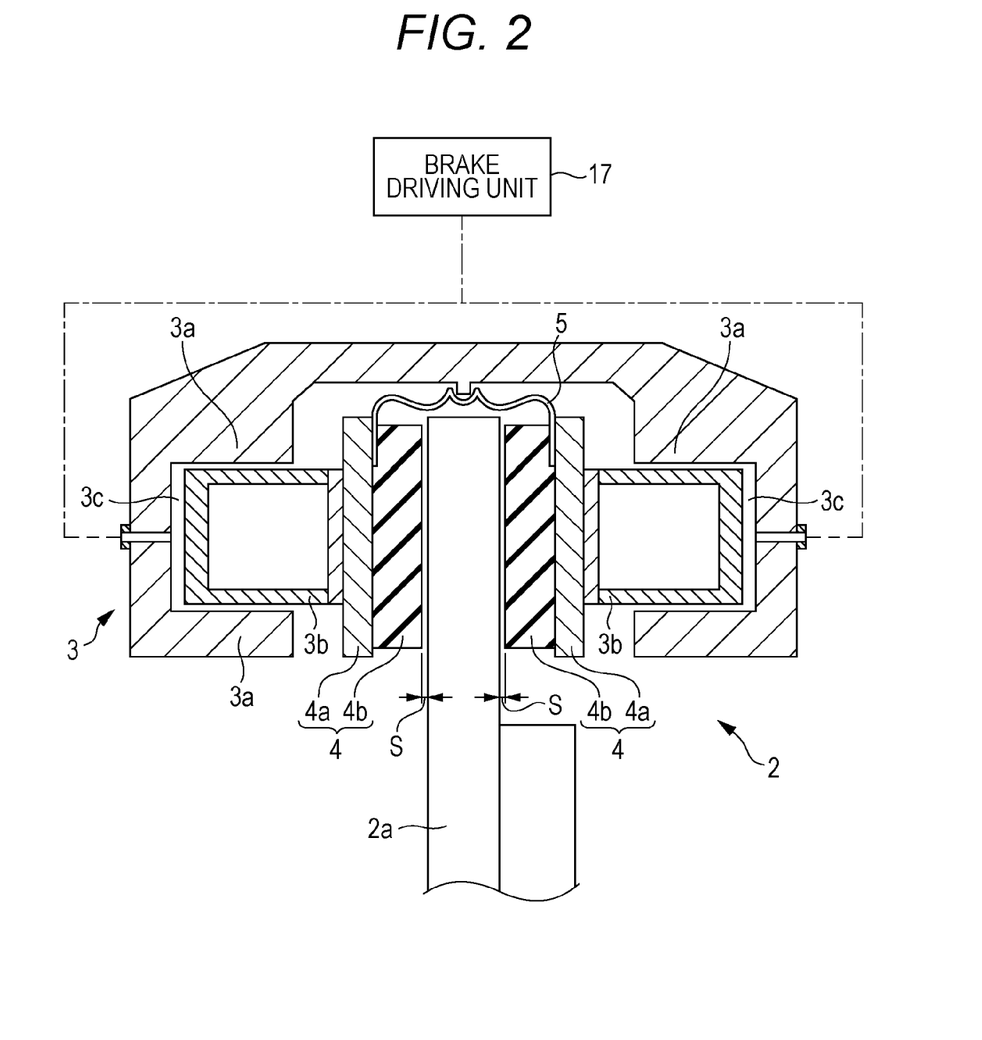
FIG. 2 is a sectional view of a vehicle disc brake.

As illustrated in FIG. 2, the disc brake 2 of this example is an opposed-piston type: cylinders 3a are formed in surfaces opposed to the disc rotor 2a of the caliper 3, and a piston 3b is mounted on each cylinder 3a. A back metal 4a of a brake pad 4 is fixed to a front surface of the piston 3b, and a pad body 4b serving as the friction member is fixed to the back metal 4a.

When a brake fluid pressure is supplied from a later-described brake driving unit 17 to a brake cylinder chamber 3c which is closed by the cylinder 3a and the piston 3b, the piston 3b is pushed out, and the disc rotor 2a is pressed and nipped by the pad bodies 4b, whereby a brake force is applied. The brake pads 4 are biased by a return spring 5 in a direction where the brake pads 4 separate from each other. When the brake fluid pressure supplied to the brake cylinder chamber 3c is released, the brake pads 4 retreat with a biasing force of the return spring 5 in the direction where the brake pads 4 separate from each other, and each of the pad bodies 4b faces the disc rotor 2a with a predetermined brake clearance S.

The brake fluid pressure applied to the disc brake 2 is basically supplied from a master cylinder 10. The master cylinder 10 pressurizes the brake fluid according to a pressing amount or a pressing force applied to a brake pedal 10a. The master cylinder 10 is provided with a vacuum booster that makes use of an intake pipe negative pressure of an engine.

When a driver presses the brake pedal 10a, the brake fluid of the master cylinder 10 is pressurized, and then applied to the disc brake 2 provided in each of the four wheels through the brake driving unit 17. At this point, there is an idle time when no brake force is generated until the brake clearance S is narrowed to cause the pad body 4b to press the disc rotor 2a.

Accordingly, when the pad body 4b is slightly brought into contact with or brought close to the disc rotor 2a, the brake clearance S becomes zero or minimal, thereby improving brake responsiveness. However, it is undesirable always to bring the pad body 4b slightly into contact with or close to the disc rotor 2a because this causes the generation of brake drag.

For this reason, in the example, timing (brake timing) in which the driver presses the brake pedal 10a is previously sensed, brake pre-pressure is supplied to the brake cylinder chamber 3c of the disc brake 2 immediately before a brake operation is performed, so that an invalid stroke (the idle time) is made zero or minimal when the driver presses the brake pedal 10a. In other words, the pad body 4b is slightly brought into contact with or brought close to the disc rotor 2a by the brake pre-pressure in order to make the brake clearance S zero or minimal against the biasing force of the return spring 5

The brake pre-pressure control is performed by a brake electronic control unit (BRK_ECU) 11 in FIG. 1, which serves as the brake controlling unit of the present invention. The BRK_ECU 11 is mainly constructed by a microcomputer, includes a CPU and a known nonvolatile memory such as a ROM, a RAM, and EEPROM. According to a control program stored in the memory, the CPU supplies a brake pre-pressure to the disc brake 2 and sets release timing of the supplied brake pre-pressure, and updates a later-described learning correction factor Kpr that is used to correct by learning a brake pre-pressure Ppr. Various kinds of fixed data such as a table and a map are stored in the ROM in addition to the control program. A learning correction table is also stored in the nonvolatile memory.

An onboard camera 12 is installed in an upper portion inside a windshield of the vehicle 1. The onboard camera 12 is a stereo camera unit including a main camera 12a and a sub-camera 12b. The cameras 12a and 12b capture images of the running environment ahead the subject vehicle 1 in a running direction. The images captured by the cameras 12a and 12b are subjected to predetermined image processing and then output by an image processing unit (IPU) 13. The onboard camera 12 and the IPU 13 together serve as the running environment recognizing unit of the present invention.

An input port of the BRK_ECU 11 receives, for example, an image signal processed by the IPU 13, a vehicle speed (subject vehicle speed) Vsp of the subject vehicle 1 detected by a vehicle speed sensor 14, an accelerator opening degree θacc detected by an accelerator opening degree sensor 15 that serves as the accelerator opening degree detecting unit of the present invention, and ON/OFF signals output from a brake switch 16 that serves as the brake detecting unit of the present invention and is turned on when the brake pedal 10a is pressed.

The brake driving unit 17 serving as the brake driving unit of the present invention is connected to an output port of the BRK_ECU 11. The brake driving unit 17 is interposed between the master cylinder 10 and each disc brake 2, and includes a hydraulic control unit (HCU) that increases and decreases the brake fluid pressure supplied to each disc brake 2. The HCU includes a pump that pressurizes the brake fluid, an accumulator, and a solenoid valve that adjusts the brake fluid pressure.

When receiving a brake pre-pressure signal from the BRK_ECU 11, the brake driving unit 17 supplies the previously-set brake pre-pressure Ppr to each disc brake 2 to actuate the piston 3b, thereby making the brake clearance S zero or minimal. In other words, the pad body 4b is slightly brought into contact with or brought close to the disc rotor 2a. The brake pre-pressure Ppr is adjusted to an optimum value for the vehicle.

When receiving a brake pre-pressure release signal from the BRK_ECU 11, the brake driving unit 17 releases the brake pre-pressure Ppr supplied to each disc brake 2.

Figure 3:
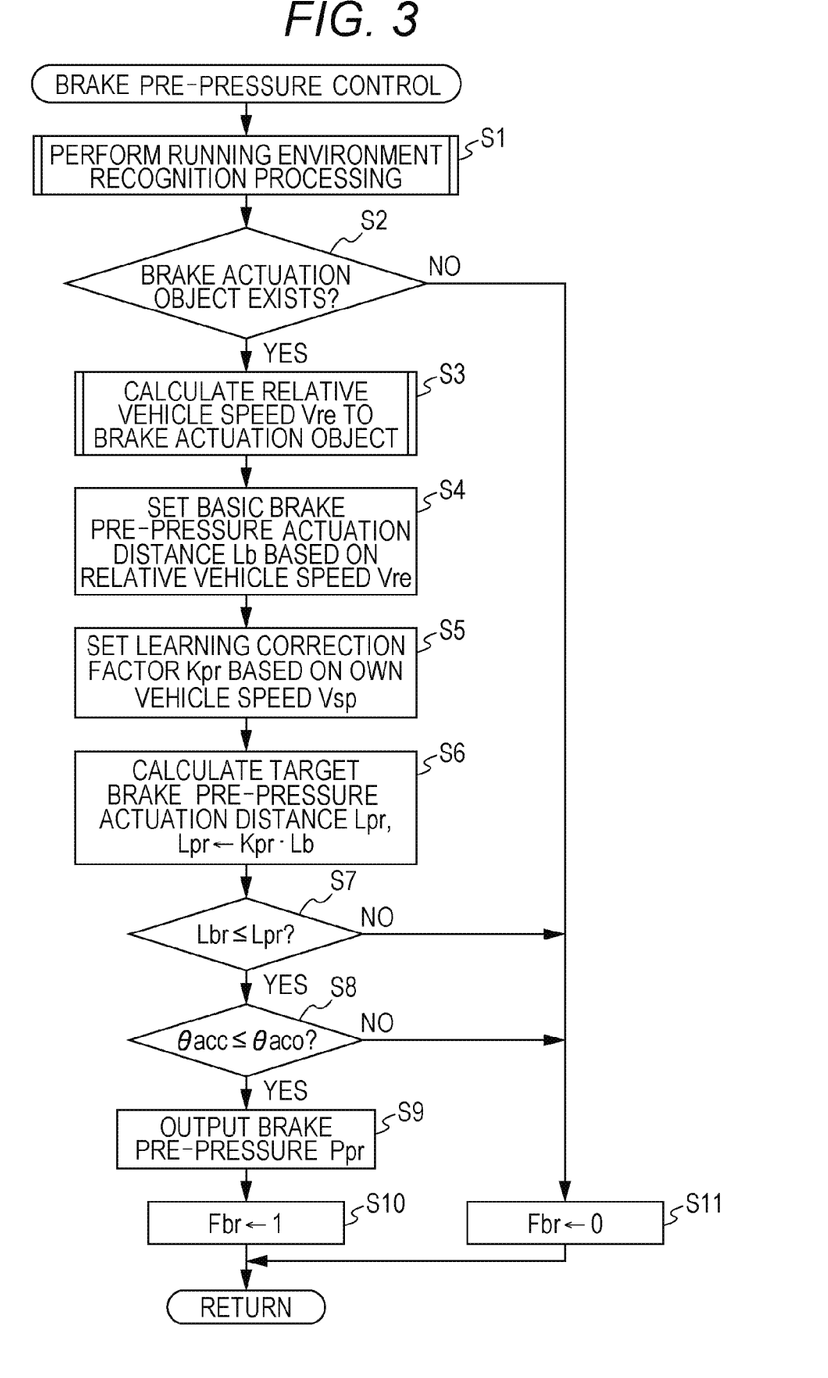
FIG. 3 is a flowchart illustrating a brake pre-pressure control routine.
Figure 4:
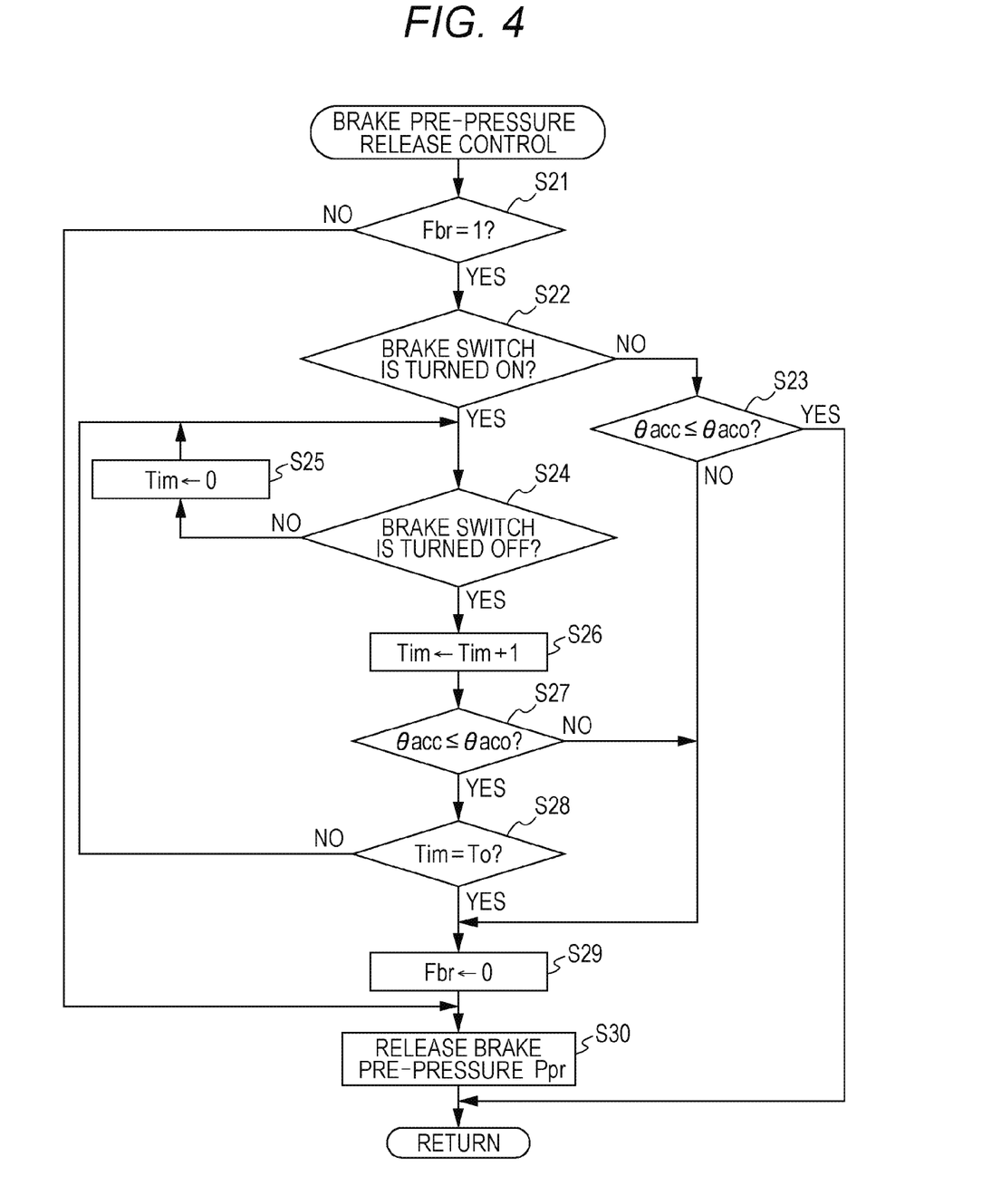
FIG. 4 is a flowchart illustrating a brake pre-pressure release control routine.
Figure 5:
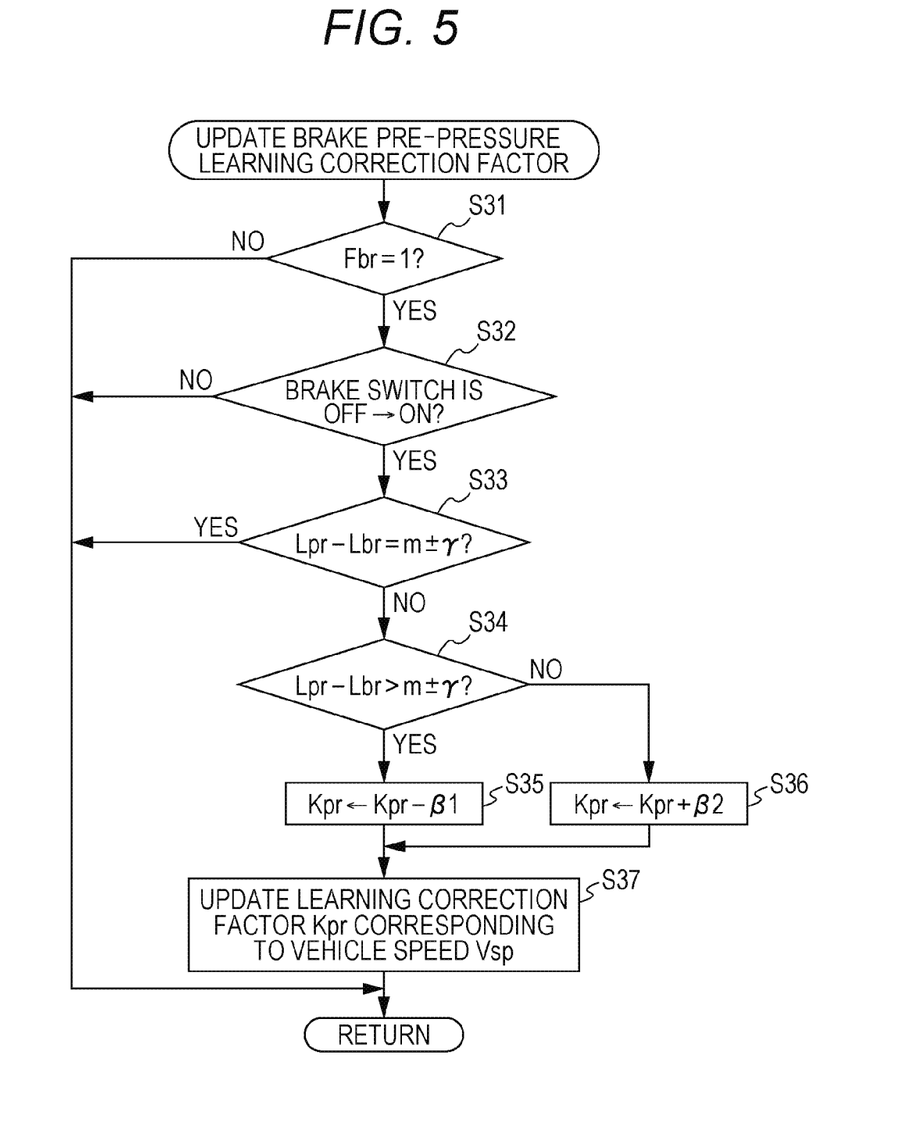
FIG. 5 is a flowchart illustrating a brake pre-pressure learning correction factor update routine.

Specifically, in the BRK_ECU 11, the supply control of the brake pre-pressure Ppr is performed according to a brake pre-pressure control routine in FIG. 3, the release control of the brake pre-pressure Ppr is performed according to a brake pre-pressure release control routine in FIG. 4, and the update of the learning correction factor Kpr is set according to a brake pre-pressure learning correction factor update routine in FIG. 5.

The routine in FIG. 3 is performed in every setting calculation period. Firstly, in Step S1, the image signal output from the IPU 13 is read to recognize the running environment ahead the subject vehicle 1, a brake actuation object is identified using a known pattern matching method, and an actual distance Lbr between the subject vehicle 1 and the brake actuation object is obtained.

Figure 7:
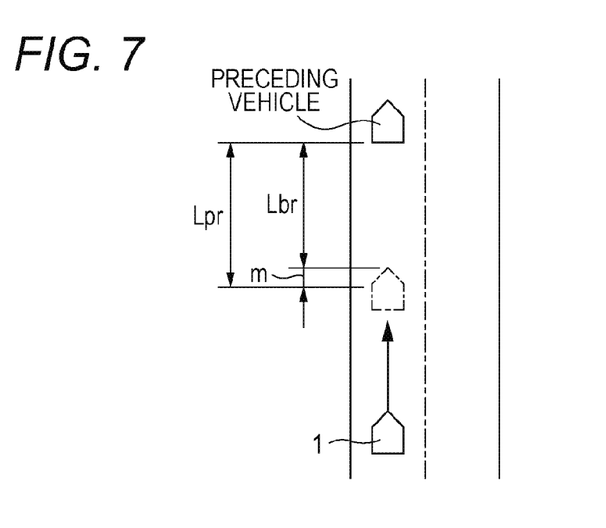
FIG. 7 is an explanatory view illustrating a brake pre-pressure timing setting state of a subject vehicle that follows a preceding vehicle.
Figure 8A:
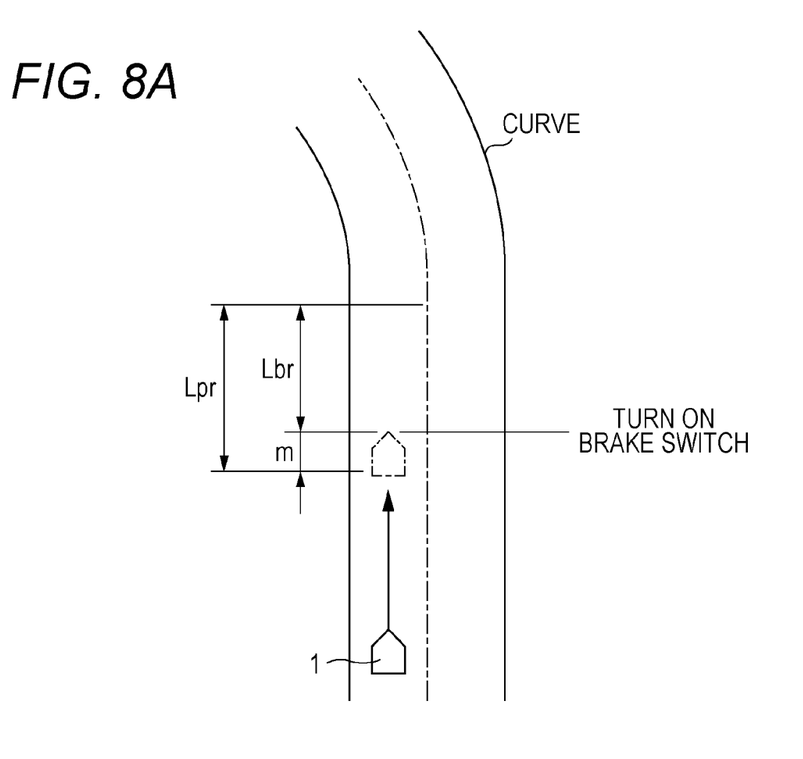
FIG. 8A is an explanatory view illustrating a brake pre-pressure timing setting state before a curve.
Figure 8B:
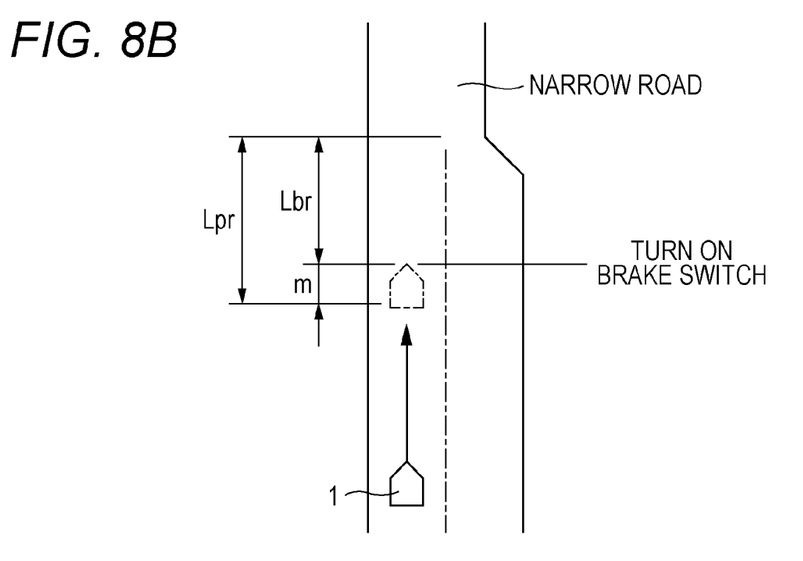
FIG. 8B is an explanatory view illustrating a brake pre-pressure timing setting state before a narrow road.
Figure 9A:
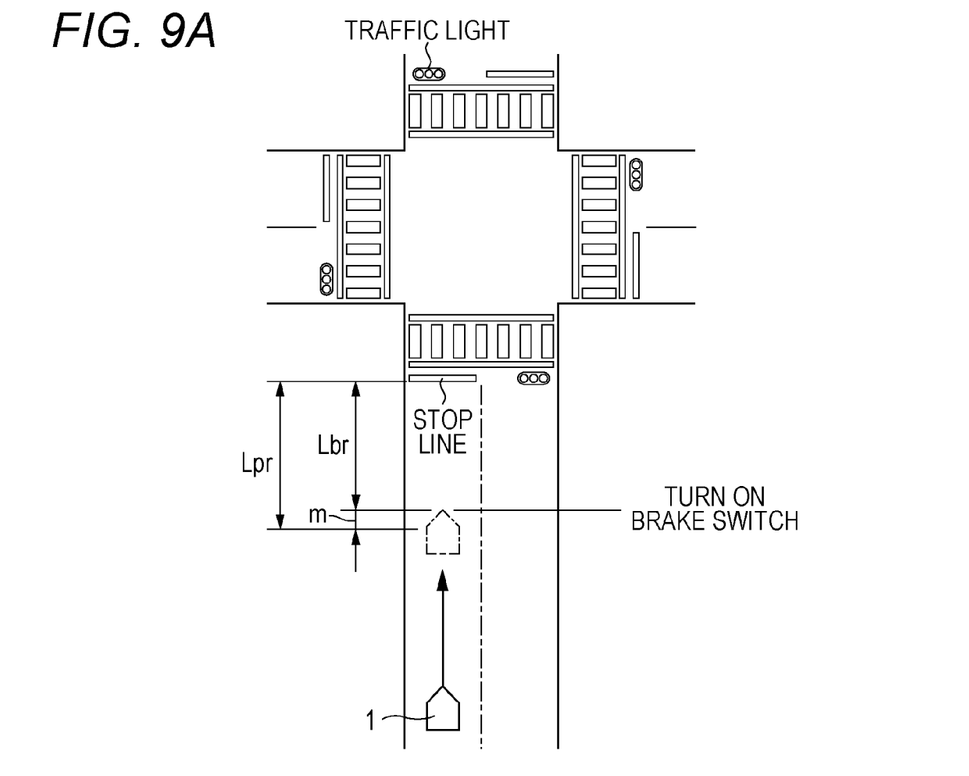
FIG. 9A is an explanatory view illustrating a brake pre-pressure timing setting state when the traffic light is lit in red at a crossing where a traffic light is installed.
Figure 9B:
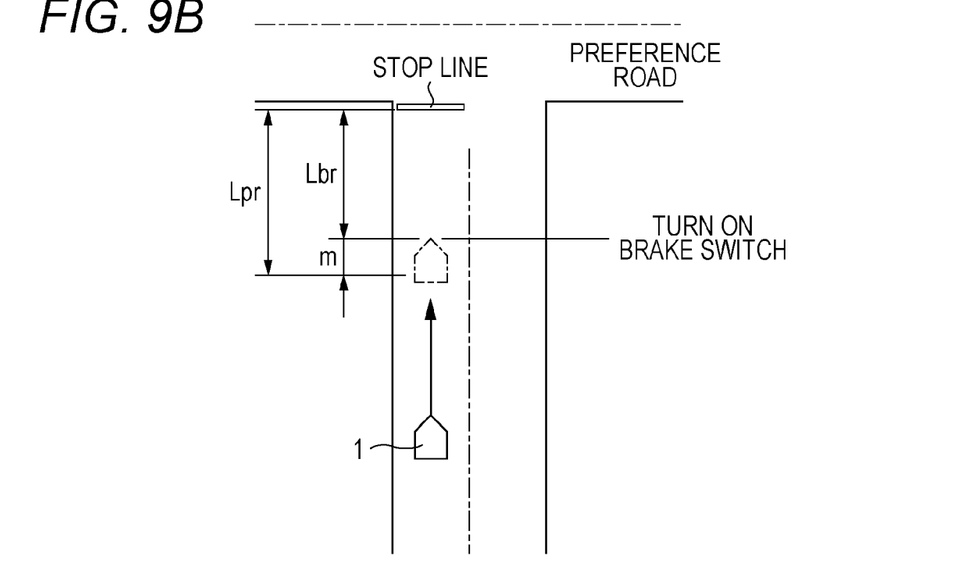
FIG. 9B is an explanatory view illustrating a brake pre-pressure timing setting state before a stop line.
Figure 10A:
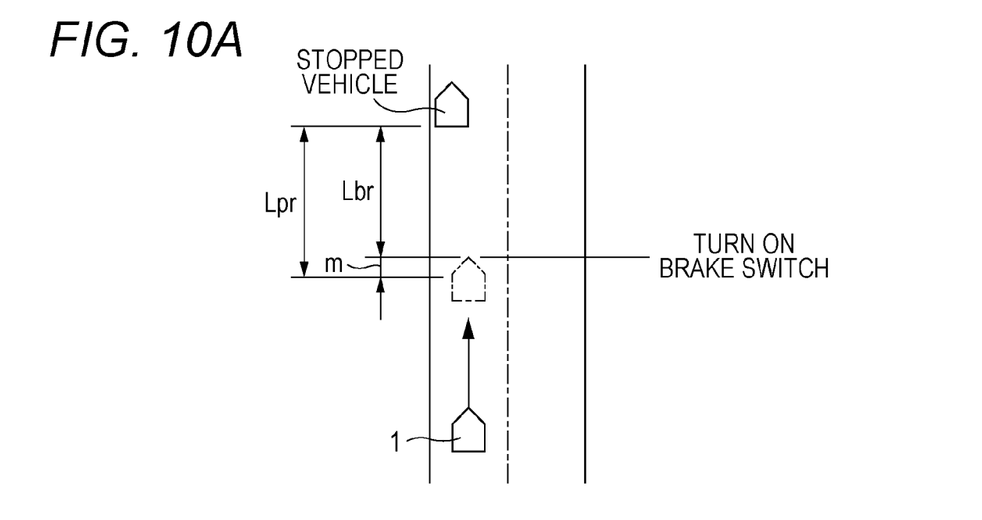
FIG. 10A is an explanatory view illustrating a brake pre-pressure timing setting state when the vehicle comes close to a stopped vehicle.
Figure 10B:
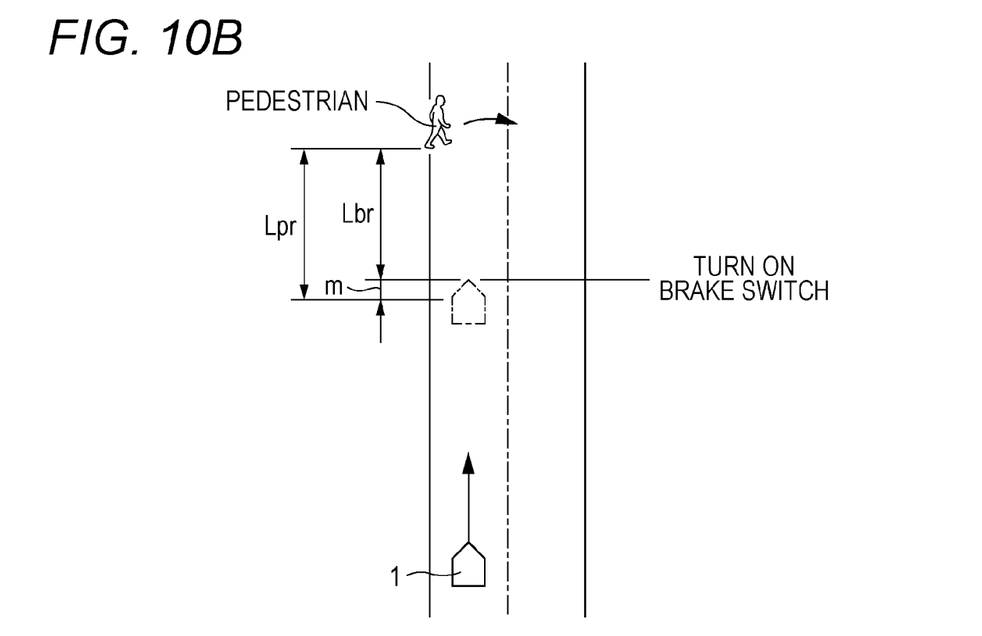
FIG. 10B is an explanatory view illustrating a brake pre-pressure timing setting state when a pedestrian is detected.

As used herein, the brake actuation object means a solid substance with respect to which the driver performs the brake operation when the driver notices it ahead the subject vehicle 1 in the traveling direction. FIGS. 7 to 10 illustrate the brake actuation objects. FIG. 7 illustrates a preceding vehicle. FIGS. 8A and 8B illustrate road shape: FIG. 8A illustrates an entrance of a curve; and FIG. 8B illustrates an entrance of a narrow road. FIGS. 9A and 9B illustrate lane line: FIG. 9A illustrates a stop line drawn on a road in front of a traffic light in red; and FIG. 9B illustrates the stop line drawn on a road facing a preference road. FIGS. 10A and 10B illustrate obstacles ahead the subject vehicle 1 in the traveling direction: FIG. 10A illustrates a stopped vehicle; and FIG. 10B illustrates a pedestrian (including animals such as a cat) crossing the road. The vehicle indicated by an alternate long and short dash line in each drawing is a position where the subject vehicle 1 moves after a predetermined time elapses.

Then, the routine proceeds to Step S2 to check whether the brake actuation object is detected. The routine proceeds to Step S3 if the brake actuation object is detected, and proceeds to Step S11 if the brake actuation object is not detected. The pieces of processing in Steps S1 and S2 correspond to the brake actuation object detecting unit of the present invention.

In Step S3, a relative vehicle speed Vre between the brake actuation object and the subject vehicle 1 is obtained, and the routine proceeds to Step S4. If the brake actuation object is the lane line such as the stop line, the fixed object such as the curve, or the pedestrian who crosses the road, the relative vehicle speed Vre is equal to the subject vehicle speed Vsp. The relative vehicle speed Vre is obtained by differentiating the distance between the subject vehicle 1 and the brake actuation object with respect to time.

In Step S4, a basic brake pre-pressure actuation distance Lb is set based on the relative vehicle speed Vre by referring to a table. Then the routine proceeds to Step S5. For the basic brake pre-pressure actuation distance Lb, the timing at which a general driver presses the brake pedal 10a is previously obtained from an experiment or the like based on the relative vehicle speed Vre, and the table is formed by adding a previously-set safety allowance m (for example, 5 to 10 [m]) to the timing in which the driver presses the brake pedal 10a.

Then the routine proceeds to Step S5, where the learning correction factor Kpr is set based on the subject vehicle speed Vsp detected by the vehicle speed sensor 14 by referring to the learning correction table stored in the nonvolatile memory. Then the routine proceeds to Step S6. The learning correction factor Kpr is used to adapt brake pre-pressure actuation timing to the driver who actually drives the subject vehicle 1. The learning correction factor Kpr is stored in the learning correction table for every subject vehicle speed Vsp. The learning correction factor Kpr is sequentially updated by the brake pre-pressure learning correction factor update routine.

In Step S6, the basic brake pre-pressure actuation distance Lb is corrected by the learning correction factor Kpr, and a target brake pre-pressure actuation distance Lpr is set (Lpr←Kpr·Lb). Then the routine proceeds to Step S7. The pieces of processing in Steps S3 to S6 correspond to the target brake pre-pressure actuation distance setting unit of the present invention.

In Step S7, the actual distance Lbr between the subject vehicle 1 and the brake actuation object is compared to the target brake pre-pressure actuation distance Lpr to determine whether or not the target brake pre-pressure actuation distance Lpr reaches the actual distance Lbr. If the target brake pre-pressure actuation distance Lpr does not reach the actual distance Lbr (Lbr>Lpr), the routine proceeds to Step S11. If the target brake pre-pressure actuation distance Lpr reaches the actual distance Lbr (Lbr≤Lpr), the routine proceeds to Step S8.

In Step S8, the accelerator opening degree θacc detected by the accelerator opening degree sensor 15 is read, and compared to an accelerator opening degree (accelerator opening degree upon release) θaco when the accelerator pedal is released. If the accelerator opening degree θacc is larger than the accelerator opening degree θaco (θacc>θaco) the accelerator pedal (not illustrated) is determined to be pressed, and the routine proceeds to Step S11. On the other hand, If the accelerator opening degree θacc is smaller than or equal to the accelerator opening degree θaco (θacc≤θaco), it is determined that the accelerator pedal is released, in other words, the driver is on the point of pressing the brake pedal 10a, and the routine proceeds to Step S9.

In Step S9, the driving signal is output to the brake driving unit 17 in order to generate the brake pre-pressure Ppr. Then the routine proceeds to Step S10. The pieces of processing in Steps S7 to S9 correspond to the brake pre-pressure outputting unit of the present invention.

In Step S10, a brake pre-pressure flag Fbr is set (Fbr←1). Then the routine is exited. As a result, the brake pre-pressure Ppr is supplied to the brake cylinder chamber 3c of each disc brake 2 from the brake driving unit 17, and the piston 3b projects against the biasing force of the return spring 5 by the brake pre-pressure Ppr. Because the brake pre-pressure Ppr is set to the value which makes the brake clearance S zero or minimal against the biasing force of the return spring 5, the pad body 4b is brought close to the disc rotor 2a or slightly brought into contact with the disc rotor 2a.

Because the pad body 4b is brought close to the disc rotor 2a or slightly brought into contact with the disc rotor 2a, the invalid stroke becomes zero or minimal when the driver presses the brake pedal 10a, thereby improving a brake feeling.

On the other hand, when the routine proceeds to Step S11 from Step S2, S7, or S8, the brake pre-pressure flag Fbr is cleared (Fbr←0), and the routine is exited.

The brake pre-pressure flag Fbr is read by the brake pre-pressure release control routine in FIG. 4. The processing of the routine in FIG. 4 corresponds to the brake pre-pressure release controller of the present invention.

The routine in FIG. 4 is performed in every setting calculation period. In Step S21, the value of the brake pre-pressure flag Fbr is referred to. The routine proceeds to Step S22 if the brake pre-pressure flag Fbr is set (Fbr=1), in other words, the brake pre-pressure Ppr is supplied to each disc brake 2, and the routine proceeds to Step S30 if the brake pressurization flag Fbr is cleared (Fbr=0).

In Step S22, the signal of the brake switch 16 is read. if the brake switch 16 is turned off, the brake pedal 10a is determined to be released, and the routine proceeds to Step S23. If the brake switch 16 is turned on, the brake pedal 10a is determined to be pressed, and the routine proceeds to Step S24.

In Step S23, the accelerator opening degree θacc is compared to the accelerator opening degree upon release θaco to check whether the accelerator pedal is pressed. If the accelerator pedal is released (θacc≤θaco), the routine is exited, and the supply of the brake pre-pressure Ppr is continued. On the other hand, if the accelerator pedal is pressed (θacc>θaco), the routine proceeds to Step S29.

In Step S24, the signal of the brake switch 16 is read. If the brake switch 16 is turned on, the routine proceeds to Step S25 to clear a count value Tim of a delay timer (Tim←0). Then the routine returns to Step S24. Accordingly, the routine actually stands by until the brake switch 16 is turned off, in other words the driver releases the brake pedal 10a.

When the brake switch 16 is turned off, the routine proceeds to Step S26 to increment the count value Tim of the delay timer (Tim←Tim+1). Then the routine proceeds to Step S27. In Step S27, the accelerator opening degree θacc is compared to the accelerator degree opening upon release θaco to check whether the accelerator pedal is pressed. The routine proceeds to Step S28 if the accelerator pedal is released (θacc≤θaco), and the routine proceeds to Step S29 if the accelerator pedal is pressed (θacc>θaco).

When the routine proceeds to Step S28 from Step 27, the count value Tim is compared to a setting delay time To (for example, 2 to 5 [sec]). When the count value Tim does not reach the setting delay time To (Tim<To), the routine returns to Step S24. Accordingly, the driver presses the brake pedal 10a within the setting delay time To, the count value Tim of the delay timer is cleared in Step S25. As a result, even if the driver performs a pumping brake operation, the brake pre-pressure Ppr is not released at each pumping braking, and thus a good brake feeling can be obtained.

If the count value Tim reaches the setting delay time To (Tim=To), the routine proceeds to Step S29 from Step S28. When the routine proceeds to Step S29 from Step S23, S27, or S28, the brake pre-pressure flag Fbr is cleared (Fbr←0). Then the routine proceeds to Step S30.

When the routine proceeds from Step S21 or S29, Step S30, the signal is output to the brake driving unit 17 in order to release the brake pre-pressure Ppr, and t the routine is exited. The brake driving unit 17 releases the brake pre-pressure Ppr supplied to each disc brake 2, and reduces the brake fluid pressure to an initial pressure. As a result, the biasing force of the return spring 5 returns the pad body 4b to an initial position, backward by the brake clearance S.

Even in the setting delay time To, when the driver presses the accelerator pedal, the brake pre-pressure Ppr supplied to the disc brake 2 is immediately released because the routine proceeds to Step S30 from Step S27 through Step S29. Therefore, brake drag is not generated in acceleration running after deceleration, thereby preventing degradation of power performance.

The brake pre-pressure learning correction factor update routine in FIG. 5 will be described below. The pieces of processing in the brake pre-pressure learning correction factor update routine correspond to the brake pre-pressure learning correction factor updating unit of the present invention.

In Step S31 of the brake pre-pressure learning correction factor update routine, the value of the brake pre-pressure flag Fbr is read to check whether or not the brake pre-pressure flag Fbr is set. The routine proceeds to Step S32 if the brake pre-pressure flag Fbr is set (Fbr=1), and the routine is exited if the brake pre-pressure flag Fbr is cleared (Fbr=0).

In Step S32, the signal of the brake switch 16 is read to check whether or not the brake switch 16 is turned on. If the brake switch 16 is turned off, the routine is exited without performing the learning. On the other hand, if the brake switch 16 is turned on, in other words, if the driver presses the brake pedal 10a, the routine proceeds to Step S33.

In Step S33, it is checked whether or not a difference (Lpr−Lbr) between the latest target brake pre-pressure actuation distance Lpr set in Step S6 of FIG. 3 and the actual distance Lbr to the current brake actuation object falls within a dead zone width±γ (for example, γ=2 to 3 [m]) around the safety allowance m. If the difference (Lpr−Lbr) falls within the setting range (m±γ) (Lpr−Lbr=m±γ), the routine is exited without performing the learning. If the difference (Lpr−Lbr) is out of the setting range (m±γ), the routine proceeds to Step S34, and the difference (Lpr−Lbr) is compared to the setting range (m±γ). If the difference (Lpr−Lbr) is larger than the setting range (m±γ) (Lpr−Lbr>m±γ), the routine proceeds to Step S35. On the other hand, if the difference (Lpr−Lbr) is smaller than or equal to the setting range (m±γ) (Lpr−Lbr≤m±γ), the routine proceeds to Step S36.

In Step S35, a new learning correction factor Kpr is set (Kpr←Kpr−β1) by subtracting a setting value β1 from the learning correction factor Kpr set in Step S5 of FIG. 3. Then the routine proceeds to Step S37. In Step S36, the new learning correction factor Kpr is set (Kpr←Kpr+β2) by adding a setting value β2 to the learning correction factor Kpr set in Step S5 of FIG. 3. Then the routine proceeds to Step S37. The setting values β1 and β2 may be equal to or different from each other. In this example, the setting values β1 and β2 are set to approximately 0.1 to 0.2. In the learning correction table, each learning correction factor Kpr stored for each vehicle speed Vsp has the initial value of 1.

When the routine proceeds to Step S37 from Step S35 or S36, the learning correction factor Kpr stored in an address corresponding to the subject vehicle speed Vsp read in Step S5 of FIG. 3 is updated to the currently obtained learning correction factor Kpr. Then the routine is exited.

The learning correction factor Kpr is steadily updated as the driver drives the subject vehicle 1, and the learning correction factor Kpr unique to the driver is finally set for each vehicle speed Vsp. Therefore, when the driver drives the subject vehicle 1 on a continuous basis, the brake timing unique to the driver is previously sensed, and the supply of the brake pre-pressure Ppr can be started at an optimum timing.

Figure 6A:
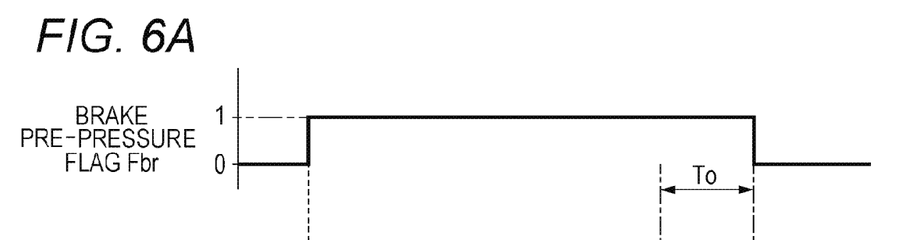
FIG. 6A is a timing chart of a pre-pressure flag.
Figure 6B:
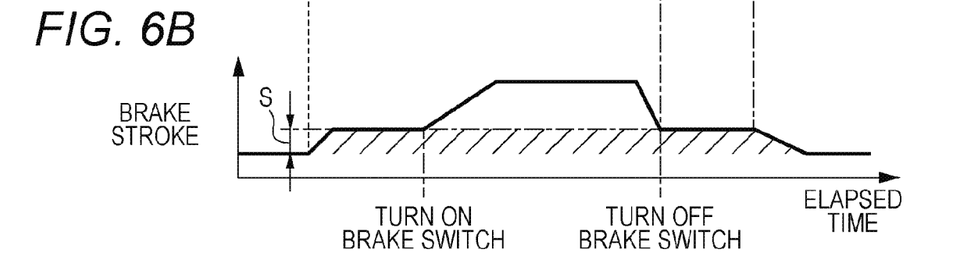
FIG. 6B is a timing chart illustrating a brake pre-pressure operation state.

Examples of a brake pre-pressure control operation and a brake pre-pressure release control operation will be described below with reference to a timing chart in FIG. 6. When the actual distance Lbr between the subject vehicle 1 and the brake actuation object reaches the target brake pre-pressure actuation distance Lpr, the brake pre-pressure flag Fbr is set, and the brake pre-pressure Ppr is supplied to each the disc brake 2 from the brake driving unit 17, whereby the brake clearance S between the pad body 4b and the disc rotor 2a becomes zero or minimal.

Accordingly, when the driver presses the brake pedal 10a, almost no invalid stroke (the idle time) is generated by the brake clearance S, so that a good brake feeling can be obtained. Because the brake pre-pressure Ppr is continuously supplied while the driver presses the brake pedal 10a, an uncomfortable feeling is not given when the driver operates the brake. Usually the brake pre-pressure Ppr is not supplied because the brake pre-pressure Ppr is supplied by previously sensing the brake operation of the driver. Therefore, no brake drag is generated, and therefore a decrease in power performance of the vehicle 1 or unnecessary abrasion of the pad body 4b can be avoided thereby improving fuel efficiency.

Because the brake fluid pressure supplied from the brake driving unit 17 makes the brake clearance S to zero or minimal, it is not necessary to provide a special component for a brake system including the master cylinder 10, the disc brake 2, and the brake fluid pressure circuit. As a result, a reduction in the number of components and simplification of the structure can achieved, thereby reducing the production cost.

Even after the driver releases the pedal pressure to the brake pedal 10a, the brake pre-pressure Ppr is not immediately released, but the setting delay time To is set. When the driver presses the brake pedal 10a again within the setting delay time To, the count value Tim of the delay timer is cleared (Tim←0), and thus the brake pre-pressure Ppr is continuously supplied. Accordingly, even if the driver performs the pumping brake operation during the deceleration running, the brake clearance S is retained at zero or minimal, and thus the invalid stroke is not generated, whereby a good brake feeling can be obtained.

The present invention is not limited to the above example. For instance, while the running environment ahead the subject vehicle 1 is recognized based on the image photographed by the onboard camera 12 in the example, the running environment may alternatively be detected by millimeter wave radar or laser radar. The brake pre-pressure Ppr may be set according to a preference of the driver, or the brake pre-pressure Ppr may be a vehicle speed sensitive type. In the vehicle speed sensitive type, a low brake pre-pressure Ppr is set for a low vehicle speed, and a higher brake pre-pressure Ppr may be set as the vehicle speed increases. Similarly, the safety allowance m may be variably set according to preference of the driver.

The brake may be a hydraulic drum brake. In this case, the rotating member corresponds to a brake drum, the friction member corresponds to a brake shoe, and the brake clearance corresponds to a gap between the brake drum and the brake shoe.

The invention claimed is:

1. A vehicle brake pressure controller comprising:
   a running environment recognizing unit mounted on a vehicle and recognizing a running environment ahead the vehicle;
   a brake driving unit supplying a brake fluid pressure to a brake provided in the vehicle and pressing a friction member against a rotating member rotating together with an axle of the brake; and
   a brake controlling unit determining the brake fluid pressure supplied to the brake from the brake driving unit, wherein the brake controlling unit includes:
   a brake actuation object detecting unit detecting a brake actuation object based on the running environment recognized by the running environment recognizing unit;
   a target brake pre-pressure actuation distance setting unit determining a target brake pre-pressure actuation distance based on a relative speed between the brake actuation object and the vehicle when the brake actuation object detecting unit detects a brake actuation object, wherein the target brake pre-pressure actuation distance setting unit determines the target brake pre-pressure actuation distance by correcting a basic brake pre-pressure actuation distance using a learning correction factor, the basic brake pre-pressure actuation distance being determined based on the relative speed between the brake actuation object and the vehicle, the learning correction factor being set based on a vehicle speed of the vehicle;
   a brake detecting unit detecting pressing of a brake pedal, wherein the brake controlling unit includes a brake pre-pressure learning correction factor updating unit to update the learning correction factor according to a difference between the target brake pre-pressure actuation distance and the distance to the brake actuation object, the brake actuation object being detected by the running environment recognizing unit when the brake detector detects the pressing of the brake pedal; and
   a brake pre-pressure outputting unit to output a driving signal to the brake driving unit before an operation of a brake pedal is performed when a distance between the vehicle and the brake actuation object reaches the target brake pre-pressure actuation distance, the driving signal generating brake pre-pressure to bring the friction member into slight contact with or close to the rotating member.

2. The vehicle brake pressure controller according to claim 1, further comprising an accelerator opening degree detecting unit to detect an opening degree of an accelerator pedal,
   wherein, when the pressing of an accelerator pedal is detected based on the opening degree of the accelerator pedal detected by the accelerator opening degree detector, the brake pre-pressure outputting unit does not output the driving signal generating the brake pre-pressure to the brake driving unit, even if the distance between the vehicle and the brake actuation object reaches the target brake pressurization actuation distance.

3. The vehicle brake pressure controller according to claim 1, wherein the brake controlling unit includes a brake pre-pressure release controlling unit to output, to the brake driving unit, a signal that releases the brake pre-pressure after a setting delay time elapses, when the brake pre-pressure outputting unit outputs the driving signal generating the brake pre-pressure and the brake detecting unit detects the release of the brake pedal after detecting the pressing of the brake pedal.

4. The vehicle brake pressure controller according to claim 2, wherein the brake controlling unit includes a brake pre-pressure release controlling unit to output, to the brake driving unit, a signal that releases the brake pre-pressure after a setting delay time elapses, when the brake pre-pressure outputting unit outputs the driving signal generating the brake pre-pressure and the brake detecting unit detects the release of the brake pedal after detecting the pressing of the brake pedal.

5. The vehicle brake pressure controller according to claim 3, wherein the brake pre-pressure release controlling unit clears the setting delay time when the brake detector detects the pressing of the brake pedal within the setting delay time.

6. The vehicle brake pressure controller according to claim 4, wherein the brake pre-pressure release controlling unit clears the setting delay time when the brake detector detects the pressing of the brake pedal within the setting delay time.

7. The vehicle brake pressure controller claim 3, wherein the brake pre-pressure release controlling unit outputs a signal to release the brake pre-pressure to the brake driving unit when the accelerator opening degree detecting unit detects the pressing of the accelerator pedal within the setting delay time.

8. The vehicle brake pressure controller claim 4, wherein the brake pre-pressure release controlling unit outputs a signal to release the brake pre-pressure to the brake driving unit when the accelerator opening degree detecting unit detects the pressing of the accelerator pedal within the setting delay time.

9. The vehicle brake pressure controller claim 5, wherein the brake pre-pressure release controlling unit outputs a signal to release the brake pre-pressure to the brake driving unit when the accelerator opening degree detecting unit detects the pressing of the accelerator pedal within the setting delay time.

10. The vehicle brake pressure controller claim 6, wherein the brake pre-pressure release controlling unit outputs a signal to release the brake pre-pressure to the brake driving unit when the accelerator opening degree detecting unit detects the pressing of the accelerator pedal within the setting delay time.

11. A vehicle brake pressure controller comprising:
   a running environment recognizing unit mounted on a vehicle and configured to recognize a running environment ahead the vehicle;
   a brake driving unit to supply a brake fluid pressure to a brake provided in the vehicle and press a friction member against a rotating member rotating together with an axle of the brake; and
   a controller including a processor and a non-transitory memory storing a control program, wherein:
   the control program, when executed by the processor, causes the controller to:
      detect a brake actuation object based on the running environment recognized by the running environment recognizing unit;
      determine a target brake pre-pressure actuation distance based on a relative speed between the brake actuation object and the vehicle when a brake actuation object is detected;
      determine the target brake pre-pressure actuation distance by correcting a basic brake pre-pressure actuation distance using a learning correction factor, the basic brake pre-pressure actuation distance being determined based on the relative speed between the brake actuation object and the vehicle, the learning correction factor being set based on a vehicle speed of the vehicle;
      detect pressing of a brake pedal;
      update the learning correction factor according to a difference between the target brake pre-pressure actuation distance and the distance to the brake actuation object, the brake actuation object being detected when the pressing of the brake pedal is detected; and
      output a driving signal to the brake driving unit before an operation of a brake pedal is performed, when a distance between the vehicle and the brake actuation object reaches the target brake pre-pressure actuation distance, the driving signal generating brake pre-pressure to bring the friction member into slight contact with or close to the rotating member.

12. The vehicle brake pressure controller according to claim 11, wherein the control program, when executed by the processor, further causes the controller to:
   detect an opening degree of an accelerator pedal, and
   when the pressing of an accelerator pedal is detected based on the opening degree of the accelerator pedal, not output the driving signal generating the brake pre-pressure to the brake driving unit, even if the distance between the vehicle and the brake actuation object reaches the target brake pressurization actuation distance.

13. The vehicle brake pressure controller according to claim 11, wherein the control program, when executed by the processor, further causes the controller to:
   output, to the brake driving unit, a signal that releases the brake pre-pressure after a setting delay time elapses, when the driving signal generating the brake pre-pressure is output and the release of the brake pedal is detected after detecting the pressing of the brake pedal.

14. The vehicle brake pressure controller according to claim 13, wherein the control program, when executed by the processor, further causes the controller to:
   clear the setting delay time when the pressing of the brake pedal is detected within the setting delay time.

15. The vehicle brake pressure controller claim 13, wherein the control program, when executed by the processor, further causes the controller to:
   output a signal to release the brake pre-pressure to the brake driving unit when the pressing of the accelerator pedal is detected within the setting delay time.

* * * * *